United States Patent Office 3,646,118
Patented Feb. 29, 1972

3,646,118
RESOLUTION PROCESS
Bernard Goffinet, Paris, and Antoine Locatelli, Rosny-sous-Bois, France, assignors to Roussel-UCLAF, Paris, France
No Drawing. Filed July 5, 1968, Ser. No. 742,532
Claims priority, application France, July 7, 1967, 113,581
Int. Cl. C07c 51/42, 61/16
U.S. Cl. 260—514 P        2 Claims

ABSTRACT OF THE DISCLOSURE

A process for the recovery of d-trans-chrysanthemic acid from a mixture of dl-trans-cis-chrysanthemic acid with D(—)-threo-1-p-nitrophenyl-2-dimethylamino - propane-1,3-diol.

STATE OF THE ART

Among the most common natural insecticides, particularly for domestic use, are pyrethrines which are extracted from pyrethrum flowers. The extracted pyrethrines are a relatively complex mixture, but the principal active ingredient is pyrethrin 1 which is the ester of d-trans-chrysanthemic acid and pyrethrolone, a natural alcohol.

Due to the difficulties in hand harvesting of pyrethrum flowers, low yields and the instability of pyrethrolone, attempts have been made to synthetically produce active analogs. Among the best known are allethrine, the ester of dl-cis-trans-chrysanthemic acid and dl-allethrolone; neopynamine, the ester of dl-cis-trans-chrysanthemic acid and hydroxymethylphthalimide; and the ester of benzylfurylmethyl alcohol and dl-cis-trans-chrysanthemic acid.

All these insecticides are esters of the same acid, namely chrysanthemic acid which occurs in four different forms due to double isomerism of the molecule, optical and geometrical. Of the four isomers, the d-forms are the most active, but the d-cis form has only about 30% of the activity of the d-trans form. Therefore, attempts have been made to recover the d-trans form from the commercial trans-cis-chrysanthemic acid which is synthetically produced, but previous attempts have been unsuccessful due to the problems involved in selectively separating one isomer from a mixture of four isomers of chrysanthemic acid.

OBJECTS OF THE INVENTION

It is an object of the invention to provide a novel resolution process for the recovery of d-trans chrysanthemic acid from dl-cis-trans chrysanthemic acid.

It is a further object to provide a process for the recovery of l-trans acid from a mixture of l-trans and dl-cis chrysanthemic acid.

These and other objects and advantages of the invention will become obvious from the following detailed description.

The novel process of the invention for the recovery of d-trans chrysanthemic acid comprises adding D(—)threo-1-p-nitrophenyl-2-dimethylaminopropane-1,3 - diol to a solution of dl-trans-cis chrysanthemic acid in an organic solvent to form the crystalline salt of d-trans chrysanthemic acid and D(—)threo-1-p-nitrophenyl-2 - dimethylaminopropane-1,3-diol and subjecting the said crystalline salt to acid hydrolysis to form d-trans chrysanthemic acid.

The organic solvent may be an ether such as ethyl ether, propyl ether, etc.; aromatic hydrocarbon such as benzene, toluene, etc.; aliphatic alcohols such as ethanol, methanol, etc.; aliphatic esters such as ethylacetate. Particularly preferred is isopropyl ether containing up to 15% of methanol. The acid hydrolysis is preferably effected with a strong mineral acid such as hydrochloric acid.

In a modification of the invention, the l-trans isomer can be recovered from the mother liquor containing dl-cis and l-trans chrysanthemic acid. This is effected by evaporating the mother liquor to dryness, subjecting the residue to acid hydrolysis and forming an organic solution of dl-cis and l-trans chrysanthemic acid, reacting the latter with L(+) threo 1-p-nitrophenyl-2-dimethylaminopropane-1,3-diol to form the crystalline salt of l-trans chrysanthemic acid and L(+) threo 1-p-nitrophenyl-2-dimethylaminopropane-1,3-diol, subjecting the said crystalline salt to acid hydrolysis to recover l-trans chrysanthemic acid. dl-cis chrysanthemic acid can be recovered from the mother liquors by evaporation thereof and acid hydrolysis of the residue.

In the following example there are described various preferred embodiments to illustrate the invention. However, it should be understood that the invention is not intended to be limited to the specific embodiments.

EXAMPLE

Step A.—Preparation of a mixture of dl-cis and dl-trans-chrysanthemic acid 20 g. of ethyl chrysanthemate were introduced into a mixture of 20 cc. of methanol and 12 cc. of 8 N sodium hydroxide. The said ethyl chrysanthemate was a commercial product containing 70 to 80% of dl-trans-isomer and 20 to 30% of dl-cis-isomer and its degree of purity was 96%. The reaction mixture was refluxed for three hours in a nitrogen atmosphere and with stirring after which the alcohols were distilled off while working in a nitrogen atmosphere. 20 cc. of water were added and the distillation was continued in vacuo. Upon slight cooling, sodium chrysanthemate crystallized and this product was then introduced into 13 cc. of concentrated hydrochloric acid and the solution was extracted with methylene chloride. The extracts were dried, the methylene chloride was evaporated in vacuo and entrained with isopropyl ether, then evaporated to dryness in vacuo to obtain 16.5 g. (a yield of 96%) of a crystalline product consisting of a mixture of dl-trans and dl-cis chrysanthemic acid melting under 50° C. and having an acid number of 327–325 (theory being 333).

Step B.—Formation of the levorotatory salt of d-trans-chrysanthemic acid

The product of Step A was introduced into 66 cc. of isopropyl ether containing 15% methanol and after 23.8 g. of D(—) threo 1-p-nitrophenyl-2-dimethylaminopropane-1,3-diol were added the mixture was refluxed to complete dissolution. The solution was cooled and held with stirring at −10° C. for 2 hours and was then vacuum filtered. The residue was slurried with ice cooled solvent and dried in the dark to obtain 14.5 g. (35% yield) of the salt of d-trans-chrysanthemic acid and D(+) threo 1 - p-nitrophenyl-2-dimethylaminopropane-1,3-diol having a melting point of 92° C. and a specific rotation $$[\alpha]_D^{20} = -13°$$

(ethanol) and a base titer of 58.7–58.8% (theory being 58.7).

The mother liquor of the product was designated as liquor A and its treatment will be further described.

Step C.—Recovery of d-trans chrysanthemic acid

The salt of step B was introduced into 29 cc. of 2 N hydrochloric acid and after being stirred for some minutes, the solution was extracted with methylene chloride. The extracts were washed with water, dried, treated with carbon black, filtered, and the filtrate was distilled to dryness in vacuo to obtain 5.4 g. (yield of 93%) of d-trans-chrysanthemic acid having a specific rotation $$[\alpha]_D^{20} = +15°$$

(c.=1%, ethanol) and an acid No. of 332–332.5 (theory=333).

Step. D.—Treatment of mother liquor of Step B

Mother liquor A was distilled in vacuo under a nitrogen atmosphere and the residue was introduced into 50 cc. of 2 N hydrochloric acid and the solution was extracted with methylene chloride. The extracts were washed with water, dried, treated with carbon black, filtered and evaporated to dryness in vacuo to obtain 9.45 g. (yield of 92.5%) of a mixture of l-trans and dl-cis chrysanthemic acid.

Step E.—l-Trans chrysthanthemic acid salt 13.6 g. of L(+)) threo 1-p-nitro-phenyl-2-dimethylaminopropane - 1,3 - diol were added to a mixture of l-trans and dl-cis chrystanthemic acid in 43 cc. of isopropyl ether containing 15% methanol and the mitxure was refluxed until total dissolution occurred. After cooling the solution was iced for two hours at −10° C., vacuum filtered and the solid was slurried with iced solvent and dried in the dark to obtain 11.15 g. (yield of 51.5%) of the salt of l-trans chrysanthemic acid and L(+) threo 1-p-nitrophenyl - 2-dimethylamino-propane-1,3-diol having a specific rotation $[\alpha]_D^{20} = +13$ (c.=2% in ethanol) and a basic titer of 58.9% (the theory being 58.7).

The mother liquor of this product was designated liquor B and its treatment will be described further.

Step F.—Recovery of l-trans chrysanthemic acid

The salt of Step E was introduced into 23 cc. of 2 N hydrochloric acid and the solution was stirred for some minutes and then extracted with methylene chloride. The extracts were washed with water, dried, treated with carbon black, filtered and then evaporated to dryness in vacuo to obtain 5.25 gm. (a quantitative yield) of l-trans-chrysanthemic acid having a specific rotation $$[\alpha]_D^{20} = -15° \pm 1$$

(c.=1% in ethanol) and an acid No. of 332.5 (theory 333).

Step G.—Treatment of mother liquor B

The mother liquor B was evaporated to dryness and the residue was introduced into 25 cc. of 2 N hydrochloric acid. The solution was stirred for some minutes and then extracted with methylene chloride. The extracts were washed with water, dried, treated with carbon black and evaporated to dryness in vacuo. The residue of 5.32 g. was crude dl-cis chrysanthemic acid melting around 100–105° C. It is purified by dissolution in 16 cc. of refluxing hexane, treatment with carbon black, filtration and icing to obtain 3.48 g. of pure dl-cis chrysanthemic acid melting at 114° C.

Various modifications of the process of the invention may be made without departing from the spirit or scope thereof and it is to be understood that the invention is to be limited only as defined in the appended claims.

We claim:

1. A process for the preparation of d-trans chrysanthemic acid which comprises adding D(−) threo-1-p-nitro-phenyl-2-dimethylaminopropane-1,3-diol to a solution of dl-trans-cis chrysanthemic acid in isopropyl ether containing up to 15% of methanol to form the crystalline salt of d-trans chrysanthemic acid and D(−) threo-1-p-nitro-phenyl-2-dimethylamino-propane-1,3-diol and subjecting the said crystalline salt to acid hydrolysis to form d-trans chrysanthemic acid.

2. The process of claim 1 wherein the mother liquor from the first step is evaporated to dryness, the residue is subjected to acid hydrolysis, an organic solution of dl-cis and l-trans chrysanthemic acid is formed, adding to the said solution L(+) threo-1-nitrophenyl-2-dimethylamino-propane-1,3-diol to form a crystalline salt of said diol and l-trans chrysanthemic acid and subjecting said salt to acid hydrolysis to obtain l-trans chrysanthemic acid.

References Cited

UNITED STATES PATENTS 3,499,929  3/1970  Muller et al. _____ 260—570.6

OTHER REFERENCES

Inove et al. C.A. 51, 236b, 1957.
Takei et al. Agr. Biol. Chem. 26, 362, 1962.
Campbell et al. S. Sci. Food Agri., 3, 191–2, 1952.
D'yakonov et al. Zh. Obshch Khim. 32, 928, 1962.
Eliel Stereochemistry of Carbon Compounds, p. 50, 1962.

LORRAINE A. WEINBERGER, Primary Examiner

R. GERSTL, Assistant Examiner

U.S. Cl. X.R.

260—501.17